Dec. 10, 1929.  G. B. REINA  1,738,965
VARIABLE SPEED TRANSMISSION
Filed Feb. 13, 1929
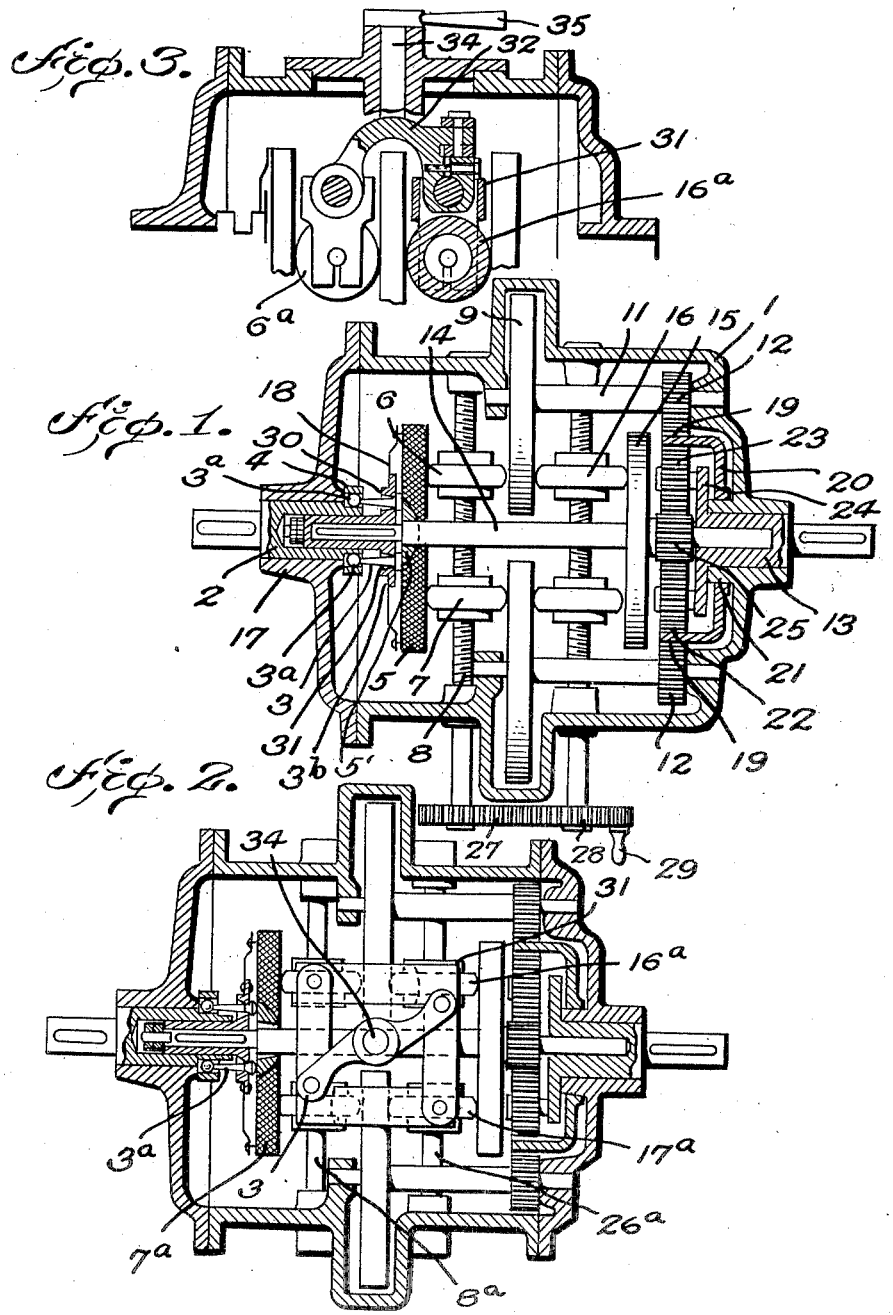

Patented Dec. 10, 1929

1,738,965

UNITED STATES PATENT OFFICE

GIAN BATTISTA REINA, OF LEGNANO, ITALY

VARIABLE-SPEED TRANSMISSION

Application filed February 13, 1929, Serial No. 339,705, and in Italy January 2, 1928.

The present invention relates to an apparatus by which the number of revolutions can be changed in a gradual continuous manner.

The invention essentially consists in the fact that the transmission of power from the driving to the driven shaft is effected through adjustable friction rollers actuating a planetary gear, the friction rollers being tangentially arranged relatively to opposite surfaces one of which, at least, corresponds to a face of a friction disc forced against the friction rollers by the rotation of the driving shaft through the intermediate of a thrust-crown in such a manner that the torque from the driving shaft is imparted to the friction disc, the spindles of the thrust-crown being previously so inclined as to bear against the disc like wedges.

The apparatus according to the invention is illustrated, by way of example only, by the accompanying drawing in one of its desired forms along with a modified form.

Fig. 1 shows the first form in longitudinal section.

Fig. 2 is a similar projection of the modified form.

Fig. 3 is an horizontal axial part-section thereof.

The casing 1, enclosing the transmission members, is traversed at one end by the driving shaft 2 carrying at its inner end a crown of spindles 3 enclosed between a cage 4 secured to the shaft 2 and a friction disc 5. The disc 5 bears against friction rollers 6 and 7, bearing in their turn against discs (or equivalent) 9 and 10 keyed to spindles 11; on the opposite end of the disc spindles 11, toothed pinions 12 are fixed, these being the satellite pinions of a planetary gear actuating the driven shaft 13. On the spindle 14 of the friction disc 5 a further disc 15 is fixed, similar to 5 and constituting the second one of the opposite surfaces relatively to which the friction rollers are tangentially arranged. Against the friction disc 15 bear the friction rollers 16 and 17 similar to 6 and 7 and intended to secure a positive power transmission by the adjustable friction system.

The spindles 3 are of special design. At one end they are fitted with a ball 3' by which they are inserted into the cage 4; the opposite end 3'' is thickened in such a manner that, if the spindles are obliged to take up an inclined position relatively to the disc 5 instead of remaining perpendicular thereto, owing to the now greater useful distance between the ball 3' and the thickened end 3'' they exert a pressure on the disc 5 through the intermediate of a cushion 5' lodged in a ball socket in the disc 5, and the disc 5 frictionally engages the rollers 6 and 7. The spindles 3 are led through holes 30 formed in a muff 31 invariably secured to an elastic plate 18 fixed to the outer face of the disc 5, so that the entraining into rotation of the disc 5 (and therewith of the whole system cinematically connected thereto) takes place through the intermediate of the elastic plate 18.

The satellite pinions 12 of the planetary gear mesh with the external toothed rim 19 of a gear 20 revolving loose on the hollow spindle 21 and being fitted also with an internal toothing 22; this internal toothed rim 22 is in mesh with the intermediate toothed pinions 23 of the planetary gear, the spindles of the pinions 23 being carried in the end flange of the bush 24 forming the end of the driven shaft 13. The pinions 23 are likewise in mesh with the sun wheel 25 fixed to the spindle 14 of the two friction discs 5 and 15.

The adjustment of the friction rollers 6—7 and 16—17 is obtained by revolving the spindles 8 and 26 which are screw-threaded to opposite hands. These spindles projecting to the inside of the casing 1, and having toothed wheels fixed on them so that when one spindle is revolved by means, for instance, of the handle 29 the other toothed wheel will revolve and both spindles 8 and 26 revolve, wherewith the friction rollers 6—7 resp. 16—17 are moved towards the axis of the apparatus or away from it. The result is that the radius of the friction circumference between the discs 5 and 15 and the friction rollers is altered and the peripheral velocity is varied. In accordance with the said variation of the peripheral velocity a corresponding variation of the angular velocity of toothed wheels 9 and 10 is obtained and therewith also of the angular speed of the satellite wheels 12 of the planetary gear.

The working of the apparatus is as follows:

After starting the driving shaft 2, the spindle crown 3 is so deformed that the spindles wedge themselves between the cage 4 and the disc 5 and the friction gear is connected up. The revolving motion is transmitted to the disc 5 through the elastic plate 18, as already stated. The friction rollers 6—7 and 16—17 start revolving and, through the intermediate of the wheels 9 and 10, bring about the rotation of the spindles 11 and satellite wheels 12. The wheels 12 cause the bell 20 to revolve; if a speed difference exists between the peripheral velocity of the bell 20 and that of the sun pinion 25, the revolution of the bell 20 entails the revolution of the intermediate toothed wheels 23 of the planetary gear. If the two peripheral velocities are equal in value but opposite in direction, the pinions 23 do not revolve. The gears 23 will revolve and therewith entrain also the driven shaft 13 in one direction or the opposite one according as the peripheral velocity of the bell 20 is greater than the peripheral velocity of the sun wheel 25 or conversely. In this manner the gradual variation of the angular speed of the driven shaft 13 is obtained; this variation can extend from a negative to a positive value, passing through zero, or may extend through an exclusively positive or exclusively negative range.

The modified form illustrated in Figures 2 and 3 mainly differs from the one just described as to the method of adjusting the friction rollers 6ª—7ª and 16ª—17ª. The rollers are carried by brackets 31 and are slidable along spindles 8ª and 26ª. The brackets 31 are coupled to one another by arms 32 pivotally connected to levers 33, the spindle 34 on which the levers are fulcrumed being operable by means of a handle 35 or equivalent. It will readily be understood that by operating the handle 35, an angular displacement can be imparted to the spindle 34 and therewith to the levers 33 so that the friction rollers will be moved towards the axis of the apparatus or away from it.

In the modified execution form according to Figures 2 and 3 the surface by which the thickened end of the spindles 3ª abuts against the cushion provided in the disc 5ª is curved, the working of said spindles being thus improved. The other parts of the apparatus remain practically unaltered.

The apparatus can of course be used wherever a power transmission with gradually variable velocity is desired. Suitable alterations, in order to adapt the apparatus to the requirements of the various applications, may be made without departing from the spirit and scope of the invention. So, for instance, the casing 1 may be built as forming part of the structure of the machine to which the apparatus is applied.

What I claim and desire to secure by United States Letters Patent is:

1. A variable speed transmission comprising a casing, a driving shaft in said casing, a second shaft in said casing in alignment with said driving shaft having a pair of spacedly disposed friction discs and a sun gear arranged thereon, coupling means connecting said shaft to the driving shaft, a pair of shafts in said casing arranged parallel to and intermediate of said friction discs, each having a pair of adjustable friction discs thereon adapted to frictionally engage the discs on the shaft connected to the driving shaft, a second pair of parallel shafts in said casing disposed parallel to the driving shaft each having a gear thereon and a friction disc arranged parallel to the friction disc on the shaft driven by the driving shaft and each disposed intermediate of and engaging a pair of the adjustable friction discs engaging the discs on the shaft driven by the driving shaft, and an orbit gear driven by the gears disposed on the pair of shafts arranged parallel to the driving shaft, planetary gears connected to said driven shaft and meshing with the orbit gear and the sun gear.

2. A variable speed transmission comprising a casing, a driving shaft in said casing, a second shaft in said casing in alignment with said driving shaft having a pair of spacedly disposed friction discs and a gear arranged thereon, coupling means connecting said shaft to the driving shaft, a pair of shafts in said casing arranged parallel to and intermediate of said friction discs, each having a pair of adjustable friction discs thereon adapted to frictionally engage the discs on the shaft connected to the driving shaft, a second pair of parallel shafts in said casing disposed parallel to the driving shaft each having a friction disc arranged parallel to the friction disc on the shaft driven by the driving shaft and each disposed intermediate of and engaging a pair of the adjustable friction discs engaging the disc on the shaft driven by the driving shaft and a driven shaft, a planetary gear connected to said driven shaft, the sun gear of said planetary gear being mounted on the shaft which is in alignment with the driving shaft, a ring gear meshing with said planetary gear and a gear on each of said shafts which are parallel to the driving shaft meshing with said ring gear.

3. A variable speed transmission comprising a casing, a driving shaft in said casing, a second shaft in said casing in alignment with said driving shaft having a pair of spacedly disposed friction discs and a sun gear arranged thereon, coupling means connecting said shaft to the driving shaft, a pair of shafts in said casing arranged parallel to and intermediate of said friction discs each having a pair of adjustable friction discs thereon adapted to frictionally engage the discs on the shaft connected to the driving shaft, means for adjusting said friction discs, a second pair of parallel shafts in said casing disposed parallel to the driving shaft, each having a gear thereon and a friction disc arranged parallel to the friction disc on the shaft driven by the driving shaft and each disposed intermediate of and engaging a pair of the adjustable friction discs engaging the discs on the shaft driven by the driving shaft, and an orbit gear driven by the gears disposed on the pair of shafts arranged parallel to the driving shaft and planetary gears connected to said driven shaft and meshing with the orbit gear and the sun gear.

GIAN BATTISTA REINA.